US008620653B2

(12) United States Patent
Cutler

(10) Patent No.: US 8,620,653 B2
(45) Date of Patent: Dec. 31, 2013

(54) MUTE CONTROL IN AUDIO ENDPOINTS

(75) Inventor: Ross G. Cutler, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 917 days.

(21) Appl. No.: 12/486,761

(22) Filed: Jun. 18, 2009

(65) Prior Publication Data

US 2010/0324891 A1 Dec. 23, 2010

(51) Int. Cl.
*G10L 15/00* (2013.01)

(52) U.S. Cl.
USPC .................... 704/233; 379/202.01; 379/88.01

(58) Field of Classification Search
USPC ........................... 704/233; 379/202.01, 88.01
See application file for complete search history.

(56) References Cited

U.S. PATENT DOCUMENTS

| | | | | |
|---|---|---|---|---|
| 5,930,352 | A | 7/1999 | Hiraiwa | |
| 6,870,919 | B2 | 3/2005 | Dobler | |
| 7,263,074 | B2 | 8/2007 | LeBlanc | |
| 2004/0239615 | A1 | 12/2004 | Firebaugh et al. | |
| 2006/0280295 | A1* | 12/2006 | Runcie | 379/88.26 |
| 2007/0037536 | A1 | 2/2007 | Battaglini et al. | |
| 2008/0232353 | A1 | 9/2008 | Vafin et al. | |
| 2009/0022305 | A1 | 1/2009 | Chavez et al. | |
| 2010/0067680 | A1* | 3/2010 | Hanson et al. | 379/202.01 |
| 2010/0080382 | A1* | 4/2010 | Dresher et al. | 379/421 |
| 2012/0020469 | A1* | 1/2012 | Brown et al. | 379/207.03 |

OTHER PUBLICATIONS

"Cisco Unified IP Phone Solutions", Retrieved at <<http://www.medwaveoptique.com/uploads/Telephonie_IP/Cisco_Unified_IP_phone_solutions.pdf>>, Nov. 2007.

* cited by examiner

*Primary Examiner* — Daniel D Abebe

(57) ABSTRACT

Architecture that uses near-end speech detection and far-end energy level detection to notify a user when a local microphone and/or speaker that the user is using, are muted. A voice activity detector is employed to detect the presence of near-end speech, sense the existing mute state of the near-end microphone, and then notify the user when the current microphone is muted. Separately or in combination therewith, received far-end voice signals are detected, the associated energy level computed, the existing mute state of the near-end audio speaker is sensed, and the user notified when the speaker is muted and/or at a reduced volume setting. These determinations enhance the user experience when the architecture is employed for communications sessions where participants connect via different communications modalities by automatically notifying the user of the audio device state, without attempting to contribute only to find that a microphone or speaker was muted.

19 Claims, 11 Drawing Sheets

MUTE CONTROL IN AUDIO ENDPOINTS

BACKGROUND

Telephone and video conferencing technology has steadily improved and become an important resource for corporate communications as well as individual communications. The benefits of having direct user interaction whether audio or audio/video conferencing are well established, in contrast with less personal methods such as email. Moreover, users can participate in the conference using a variety of modalities, such as landline telephones, IP phones, and wireless phones, via computer audio systems, as well as be grouped into a conference room while others call in.

A problem that exists in multiuser conferences is acoustic echo caused by the reappearance of originally transmitted signals by some small delay. One solution for the echo problem is to mute the microphone or speakers of conference room devices. However, a different problem then becomes to remember if a device is muted or unmuted. Many users may not realize this and begin talking to a dead microphone, for example, which is a bad experience and counterproductive to the session. A similar problem is when the speaker is muted. For example, if a participant joins a conference call and the speaker in the near-end device has been turned off, the joined participant will not hear anything. Moreover, when speaking to find out who is there, this may be an interruption to an in-process dialog.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture uses near-end speech detection and energy level detection of received far-end voice signals to notify a user when a microphone and/or speaker that is being used, are muted. A voice activity detector is employed to detect the presence of near-end speech, sense the existing mute state of the near-end microphone, and then notify the user when the current microphone is muted. Additionally, received far-end voice signals are detected, the associated energy level computed, the existing mute state or volume level of the near-end speaker is sensed, and the user notified when the speaker is muted.

These determinations enhance the user experience when the architecture is employed for communications sessions where participants connect via different communications modalities by automatically notifying the user of the audio device state, without attempting to contribute only to find that a microphone or speaker was muted.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
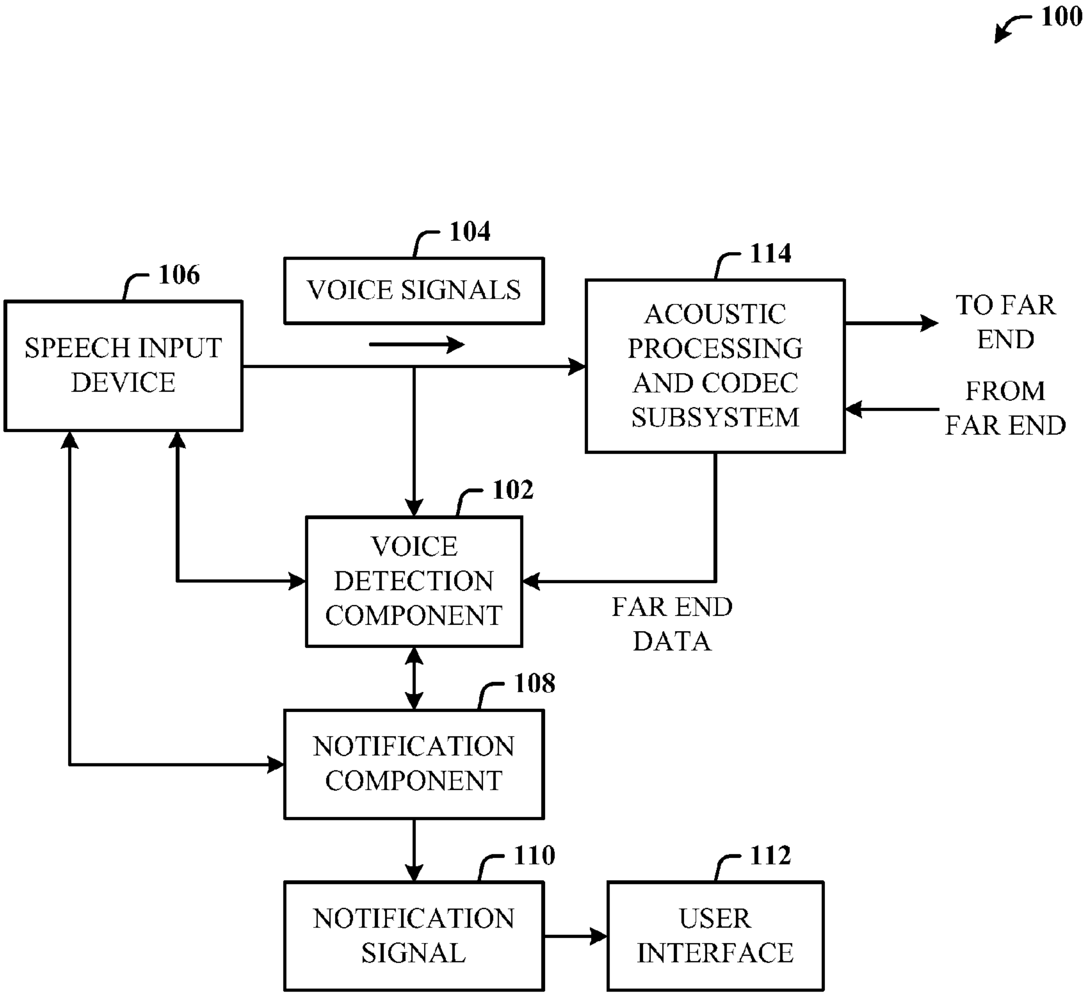
FIG. 1 illustrates a computer-implemented communications device status system in accordance with the disclosed architecture.

The disclosed architecture provides notification to a user of a near-end communications system when audio devices (e.g., speaker, microphone) are in a state other than the state desired by the user. For example, if the near-end user begins speaking in the presence of the near-end communications device such as a standard wireline telephone, IP phone, cellphone, USB phone, softphone, etc., while in a communications session (e.g., 1-to-1, 1-to-many, and many-to-1), the more efficient and effective experience is to not have to continually check whether the microphone or speaker is active. This is particularly useful in a conference room where an audio or audio/video conference is occurring and with multiple participants that may come and go.

Moreover, attendees can participate using portable computer systems that have microphones and speakers, as well as the capability to communicate over IP networks, for example. Such conference rooms can also use a standard wireline speaker phone that also includes a microphone where remote participant can call in. Thus, the potential for echo, interruptions, and false starts due to muted microphones or muted speakers can disrupt the flow of the participation.

A voice activity detector (VAD) is employed as or part of a voice detection component for detecting when a muted microphone on a near-end communications endpoint such as a computer, telephone, etc., and in combination with near-end speech, notify the user that the microphone is muted so that the user is not speaking into a dead microphone. For media stacks that already include the voice activity detector, the detection logic can be that, if VAD=True, and microphone is muted, then display message that the microphone is muted. This can be applied as well to the detection of keyboards clicks such that the click audio does not trigger unmute of the near-end microphone.

An energy detection component can be employed separately or in combination with the voice detection component to alleviate problems with a muted speaker on the near-end communications endpoint. By quantifying the amount of energy in the far-end audio signals received from far-end communications endpoint, the user can be notified if the near-end speaker needs to be unmuted so that the user can hear the speech from the far end. Typical speech can exhibit a root-mean square (RMS) value of about −24 dB, full-scale. Accordingly, the logic for speaker mute detection can be, if RMS (far-end receive signal)>−34 dB and speaker is muted, then display a message that the speaker muted.

Additionally, the speaker volume can be set very low (at a reduced volume setting) but not muted and have a similar effect. Thus, logic can operate separately for a low volume setting or using a combination of the mute detection and the low volume setting (e.g., <10% maximum). For example, the combined logic for speaker mute detection and low volume setting can be, if RMS (far-end receive signal)>−34 dB and speaker is muted and volume setting<0.10, then display a message that the speaker muted and volume is low (or similar terminology).

Energy thresholds can be employed to trigger detection at different levels, as desired. For example, detection of near-end ambient noise can also be detected as a way to determine if to notify the user of speaker mute or unmute. The energy threshold can be set to about −50 dB, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented communications device status system 100 in accordance with the disclosed architecture. The system 100 includes a voice detection component 102 for detecting voice signals 104 for input to a near-end speech input device 106, and a notification component 108 for sending a notification signal 110 when input of the voice signals 104 to the near-end speech input device 106 is blocked (e.g. muted). Thus, the voice detection component 102 receives far-end data from the far end and state (mute) of the speech input device 106 (e.g., via notification from the notification component 108 or directly from the speech input device 106).

The voice detection component 102 includes a voice activity detector that detects the voice signals 104 input to the near-end speech input device 106, which is a microphone. The system 100 can further comprise a user interface 112 that changes the status of graphical indicia (e.g., changing graphical emphasis by color, blinking, etc.) in response to receiving the notification signal 110. The graphical indicia indicate that the near-end speech input device 106 is muted. The user interface 112 can be a pop-up window which conveys that the near-end speech input device 106 is muted.

As may be typically designed, the system 100 further includes an acoustic processing and codec subsystem 114 that performs some level of acoustic echo cancellation and digitization of the voice signals 104. Thereafter, the processed voice signals are transmitted to the far-end endpoint. Return voice signals are then received from the far-end endpoint and processed for audio output at the near-end.

The voice detection component 102 detects the voice signals 104 based on wired or wireless digital signals received from a near-end two-way communications system (e.g., IP phone, cell phone, wireless handset/base station phone, etc.) that includes the speech input device 106, and the notification component 108 sends the notification signal 110 when the speech input device 106 is muted.

In one implementation, the entire system 100 can be part of a computer, such as a desktop or portable system. In another implementation, portions of the functionality of system 100 are in separate systems. For example, the speech input device 106, and acoustic processing and codec subsystem 114 can be part of a standalone communications device (e.g., tethered cell phone, cell phone, USB phone, IP phone, etc.), and the voice detection component 102, notification component 108, and user interface 112 can be hardware and/or software components of a computer system.

Figure 2:
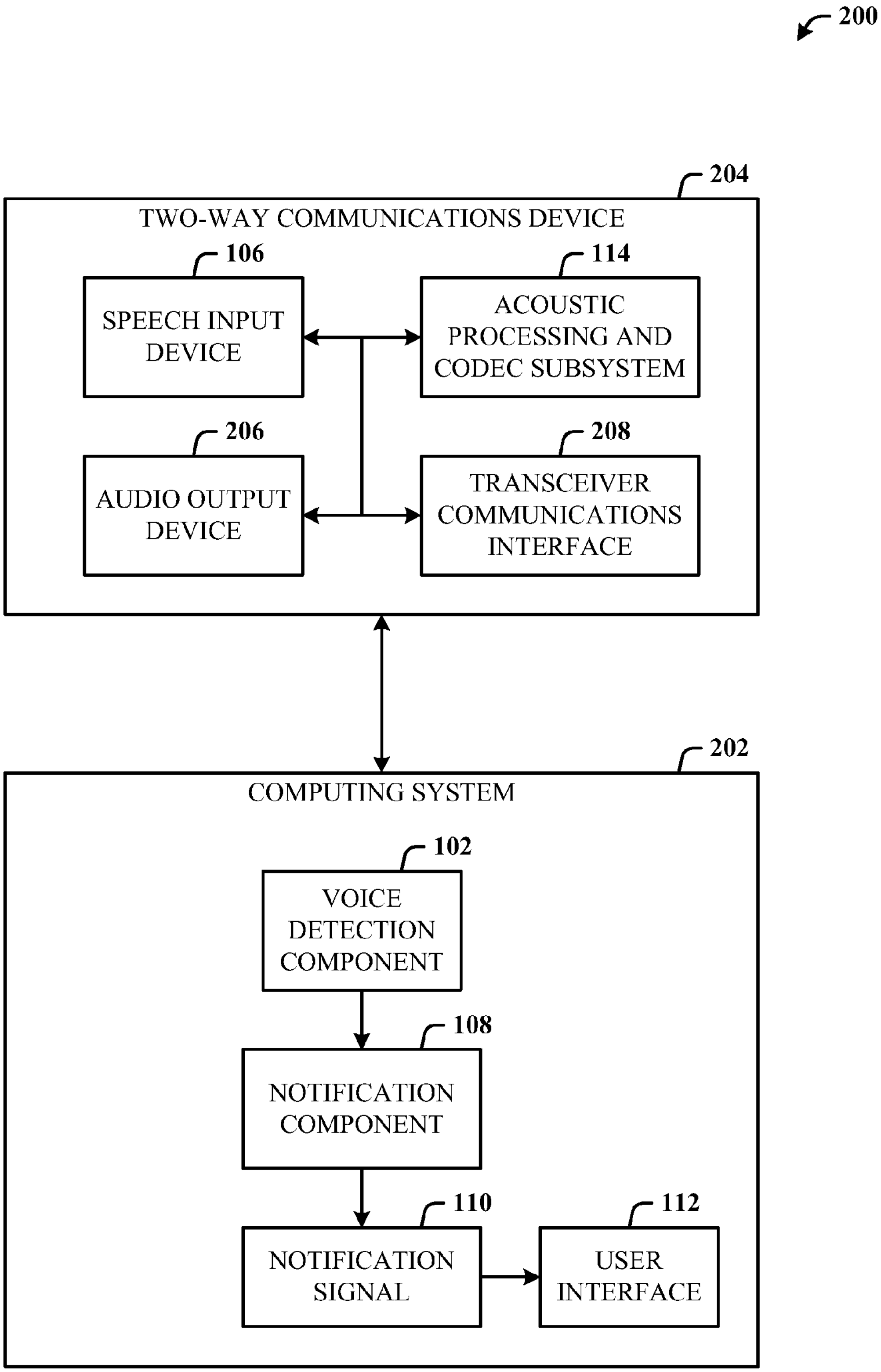
FIG. 2 illustrates a system where a computing system is in communication with a two-way communications device for mute control.

FIG. 2 illustrates a system 200 where a computing system 202 is in communication with a two-way communications device 204 for mute control. The connection between the computing system 202 and the device 204 can be a tethered serial interface (e.g., USB, IEEE 1394, etc.), bus, or wireless (e.g., licensed or unlicensed wireless technology), for example. The communications device 204 includes the speech input device 106 (e.g., microphone), the acoustic processing and code subsystem 114, an audio output device 206 (e.g., speaker), and wire/wireless transceiver communications interface 208.

Note that the transceiver communications interface 208 is optional, in that it is not necessarily needed if the components and entities of the system 300 are all part of a single system such as a computer system or a handheld mobile device.

The computing system 202 can include the voice detection component 102, notification component 108, and user interface 112 for representing the notification signal 110 as a change in status of a user interface object such as an icon, or other graphical indicia. In this scenario, once the voice detection component 102 detects voice signals, the voice detection component 102 can then also check if the speech input device 106 is muted (blocked). If muted, the voice detection component 102 sends a signal to the notification component 108 to send the notification signal 110 to the user interface 112 with the purpose of alerting the user (e.g., of the computing system 202) that the input device 106 is muted. Thereafter, the user can interact with the user interface 112 to cause the input device 106 to become unmuted (unblocked).

Note that the device 204 sends audio data even if the device 204 is muted. For example, if the device 204 is a USB speakerphone and muted, the speakerphone sends a command (e.g., HID (human interface device)) to the computing system 202, and the computing system 202 mutes (or reduces to zeros) the audio signal. Alternatively the voice detection component 102 can be implemented in the device 204; however, this introduces additional cost to the device 204. In other words, the voice detection component 102 and notification component 108 are part of the computing system 202 to which an endpoint (the device 204) is communicating, the endpoint sends data to the computing system 202 when muted and the computing system 202 responds to mute the endpoint based on the data.

It is within contemplation of the disclosed architecture that the notification signal 110 can be sent from the computing system 202 to the communications device 204 for alerting the user (of the communications device 204) that the input device 106 is muted. The notification signal 110 can be translated into an audio beep or set of beeps that indicate the input device 106 is currently muted. Alternatively, the notification signal

110 can be translated into flashing a light (e.g., display light, keypad light, etc.) on the communications device 204 to indicate the input device 106 is muted.

It is further to be understood that notification can be applied to the reverse status of the input device 106 such that the presence of the notification signal 110 indicates that the input device 106 is unmuted.

Figure 3:
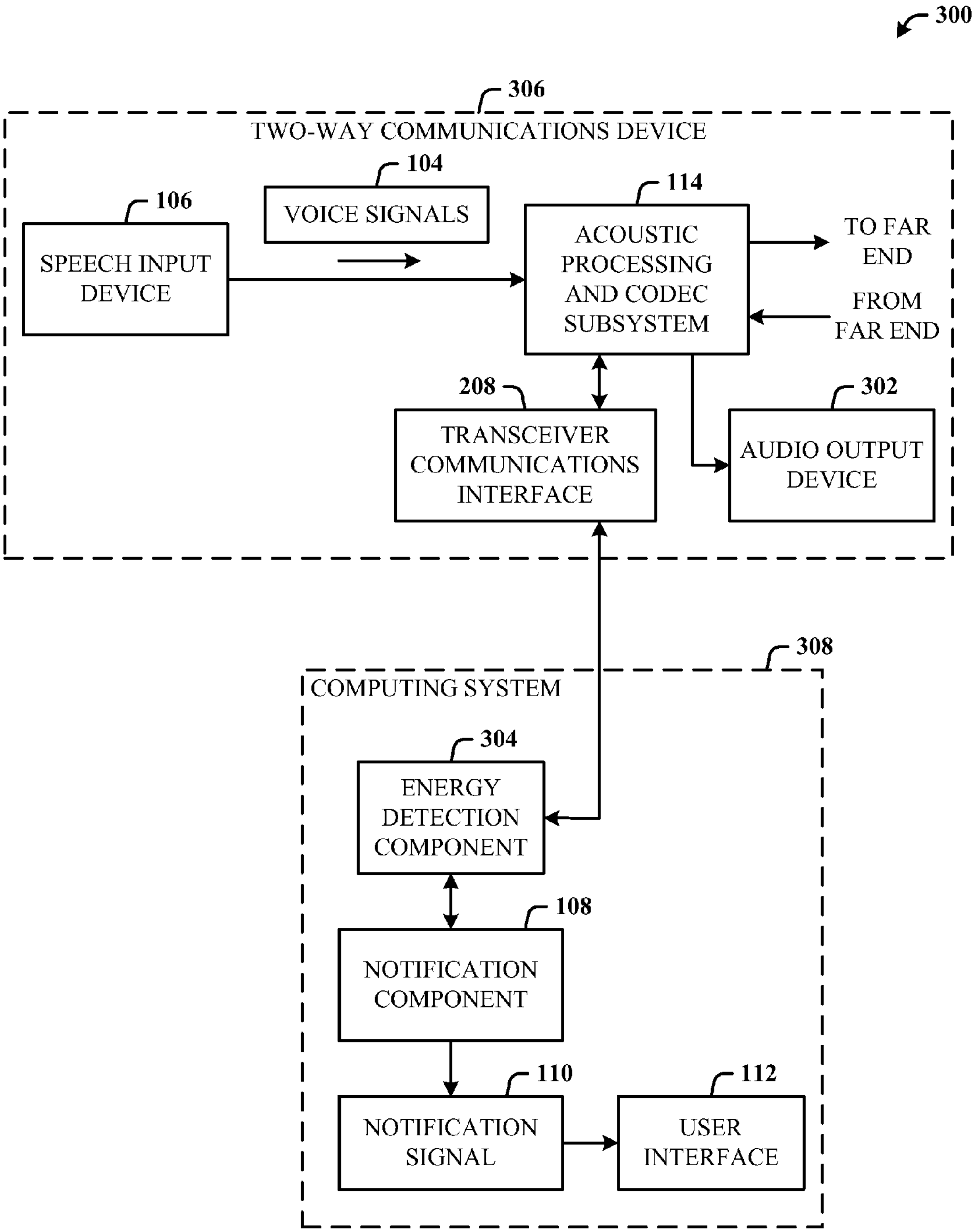
FIG. 3 illustrates a system for detecting the energy in return voice signals for audio output mute status notification.

FIG. 3 illustrates a system 300 for detecting the energy in return voice signals (far-end speech) for audio output mute status notification. The system 300 can include the speech input device 106, the acoustic processing and codec subsystem 114, notification component 108, and user interface 112, as previously described. In support of two-way communications, the system 300 further comprises an audio output device 302 (e.g., a speaker) for outputting far-end voice signals received at the near-end endpoint.

For the function of generating and sending a notification when the near-end audio output device 302 is muted, the system 300 further comprises an energy detection component 304 for detecting the energy in the far-end voice signals received from a far-end endpoint. The energy detection component 304 utilizes speaker mute information and volume input information. For example, the energy detection component 304 can employ a threshold value that when reached, indicates that far- and voice signals are being received. When reached, the notification component 110 generates and sends the notification signal 110 to the interface 112 that when processed indicates that the near-end audio output device 302 is muted. The user can then unmute the speaker to more effectively participate in the session.

All of the components and entities illustrated can be part of a single system, such as a computing system or a handheld device. Alternatively, similar to the grouping of capabilities and functionality illustrated in FIG. 2, the speech input device 106, acoustic processing and codec subsystem 114, the transceiver communications interface 208, and audio output device 302 can be part of a two-way communications device 306 separate and external from a computing system 308. The computing system 308 then includes the energy detection component 304, notification component 108, and user interface 112.

The connection between the computing system 202 and the device 204 can be a tethered serial interface (e.g., USB, IEEE 1394, etc.), bus, or wireless (e.g., licensed or unlicensed wireless technology), for example.

It is within contemplation of the disclosed architecture that the notification signal 110 can be sent from the computing system 308 to the communications device 306 for alerting the user (of the communications device 306) that the output device 302 is muted. The notification signal 110 can be translated into an audio beep or set of beeps that indicate the output device 302 is currently muted. Alternatively, the notification signal 110 can be translated into flashing a light (e.g., display light, keypad light, etc.) on the communications device 306 to indicate the output device 302 is muted.

It is further to be understood that notification can be applied to the reverse status of the output device 302 such that the presence of the notification signal 110 indicates that the output device 302 is unmuted.

The energy detection can be based on RMS (root-mean square) values. The algorithm for energy detection and notification process can be, for example, if RMS (receive signal) is>−34 dB and the audio output device is muted or set to a low volume level (according to a volume threshold value), then display a message that the audio output device is muted.

Figure 4:
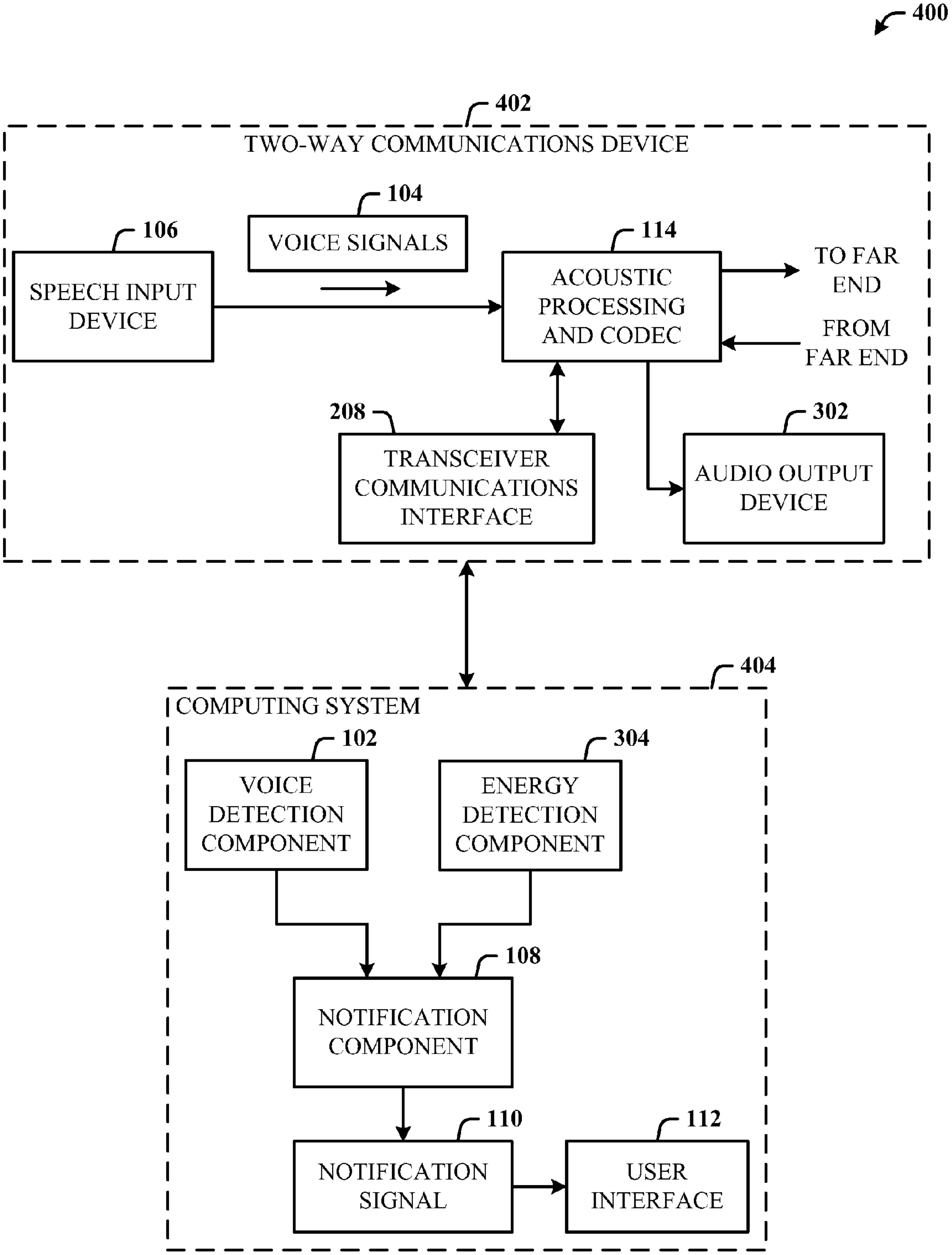
FIG. 4 illustrates a system that includes mute status notification for both a near-end speech input device and a near-end audio output device.

FIG. 4 illustrates a system 400 that includes mute status notification for both a near-end speech input device 106 and a near-end audio output device 302. The system 400 additionally includes the acoustic processing and codec subsystem 114 for processing the voice signals to the far-end endpoint and receiving voice signals from the far-end endpoint. The system 400 further includes the voice detection component 102, energy detection component 304, and the notification component 108 that communicates to both the voice detection component 102 and energy detection component 304. Note that the transceiver communications interface 208 is optional, in that it is not necessarily needed if the components and entities of the system 300 are all part of a single system such as a computer system or a handheld mobile device.

In this scenario, the notification component 108 provides the notification signal 110, which can provide the appropriate notification for either or both the near-end speaker or/and near-end microphone mute detection and notification.

In an alternative embodiment, similar to the grouping of capabilities and functionality illustrated in FIG. 2 and FIG. 3, the speech input device 106, acoustic processing and codec subsystem 114, the transceiver communications interface 208, and audio output device 302 can be part of a two-way communications device 306 separate and external from a computing system 308.

The communications device 402 then includes the transceiver communications interface 208 for communicating to the computing system 404 in a wired and/or wireless manner. The transceiver communications interface 208 facilitates the connection between the computing system 404 and the communications device 402, which interface 208 can be a tethered serial interface (e.g., USB, IEEE 1394, etc.), bus, or wireless (e.g., licensed or unlicensed wireless technology), for example.

The computing system 404 then includes the voice detection component 102, energy detection component 304, notification component 108, and user interface 112. Thus, the computing system 404 provides the appropriate notification signal 110 for either or both of the near-end speaker or/and near-end microphone mute detection and notification.

It is within contemplation of the disclosed architecture that the notification signal 110 can be sent from the computing system 404 to the communications device 402 for alerting the user (of the communications device 402) that the speech input device 106 and/or the audio output device 302 is muted. The notification signal 110 can be translated into different audio beeps or set of beeps that indicate the input device 106 and/or the output device 302 is currently muted. Alternatively, the notification signal 110 can be translated into flashing a light (e.g., display light, keypad light, etc.) on the communications device 402 to indicate that the input device 106 and/or the output device 302 are/is currently muted.

It is further to be understood that notification can be applied to the reverse status of the input device 106 and/or the output device 302 such that the presence of the notification signal 110 indicates that the corresponding devices (106, 302) are unmuted.

Put another way, the communications device status system 400, comprises the energy detection component 304 for detecting far-end voice signals based on received signal energy at a near-end, and the notification component 108 for sending the notification signal 110 based on a level of the signal energy at the near-end and when the near-end audio output device 302 is muted or at a reduced volume setting.

The system 400 further comprises the user interface 112 that changes presentation status of graphical indicia in response to the signal energy of the voice signals reaching a predetermined energy threshold level, and receipt of the notification signal 110. The graphical indicia indicate that the near-end audio output device 302 is muted. The user interface can be a pop-up window which conveys that the near-end audio output device 302 is muted.

The system 400 can further comprise the voice detection component 102 for detecting near-end voice signals for input to a microphone and for detecting that the near-end microphone is muted. The system 400 can also include the user interface 112, which pops-up in response to receipt of the notification signal 110, and changes presentation status of graphical indicia related to at least one of the microphone (speech input device 106) or the audio output device 302 to indicate that the at least one of the microphone or the audio output device 302 is muted.

Figure 5:
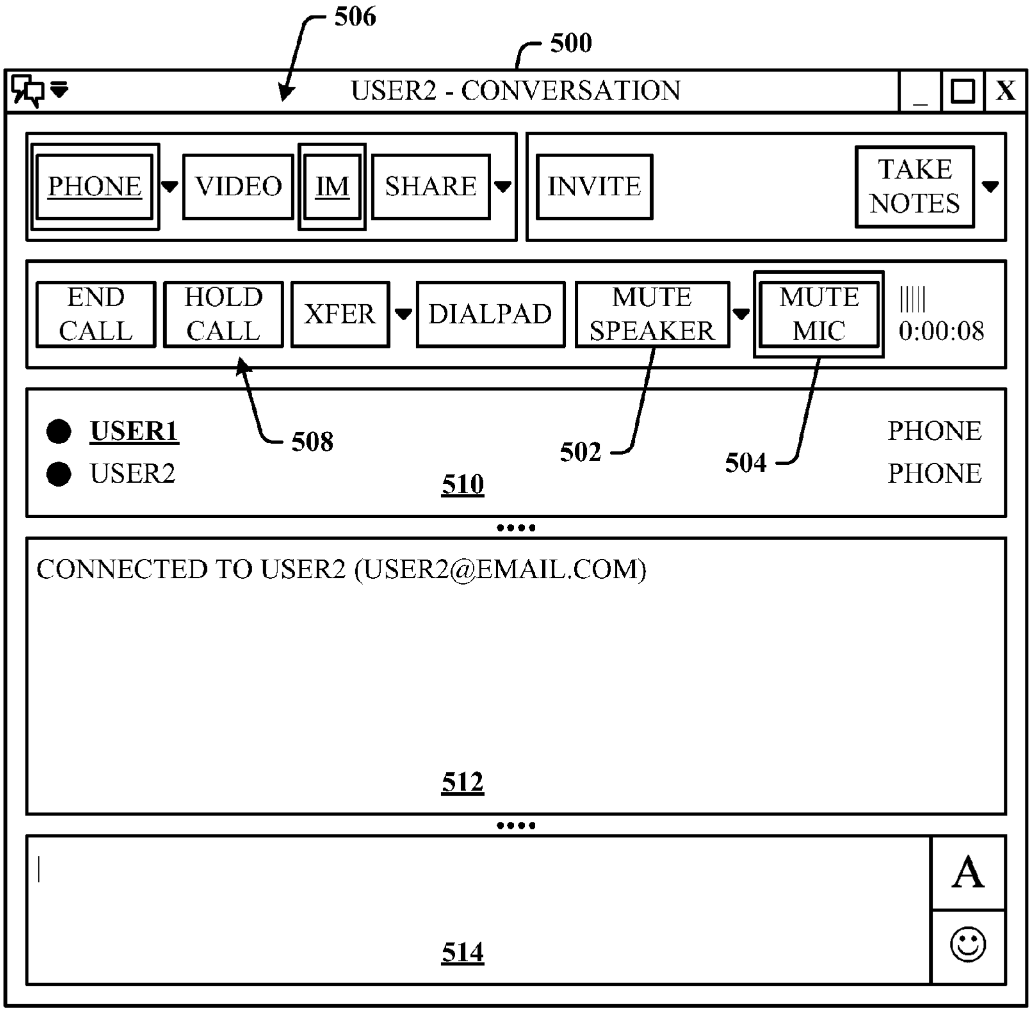
FIG. 5 illustrates an exemplary client user interface that shows a speech input device indicator associated with near-end endpoint mute state.

FIG. 5 illustrates an exemplary client user interface 500 that shows a speech input device indicator (e.g., microphone) associated with near-end endpoint mute state. For example, the indicators can include a speaker indicator 502 and microphone indicator 504. Based on the detected speech input and/or the far-end speech energy received, the notification signal is processed by the user interface 112 of FIG. 1 to cause the corresponding graphical icon to be emphasized (e.g., color, highlighting, flashing, bolding, etc.) based on the state of the restrictive near-end device (e.g., microphone or speaker). Here, based on the mute state of the microphone and the detected speech input to the microphone, the user interface 500 (e.g., pop-up window) readily indicates to the user that attention is needed to unmute the microphone.

The user interface 500 also provides indicators and controls 506 for different modalities (e.g., phone, email, video, instant messaging, sharing, etc.) for connecting to the session and interacting with other endpoints (e.g., invite), as well as control buttons 508 for call control, connection modality panel 510 for the participants and modality used by other participants to the session, a connect panel 512, and a text entry panel 514 for entering and sending text.

The user interface 500 of the User1 endpoint indicates in the connection modality panel 510 that User1 is communicating to User2 by phone as well as by instant messaging. The connect panel 512 indicates the status and email address for texting to User2. The user interface 500 also shows that the microphone is muted by emphasis (e.g., highlighting, underlining, change in indicator color, etc.) applied to the microphone indicator 504. The speaker is unmuted, as indicated by the lack of emphasis to the speaker indicator 502. Note that a textual notice can be presented separately or in combination with the graphical indicia emphasis. The user can then manually switch the mute or unmute state of the microphone.

Figure 6:
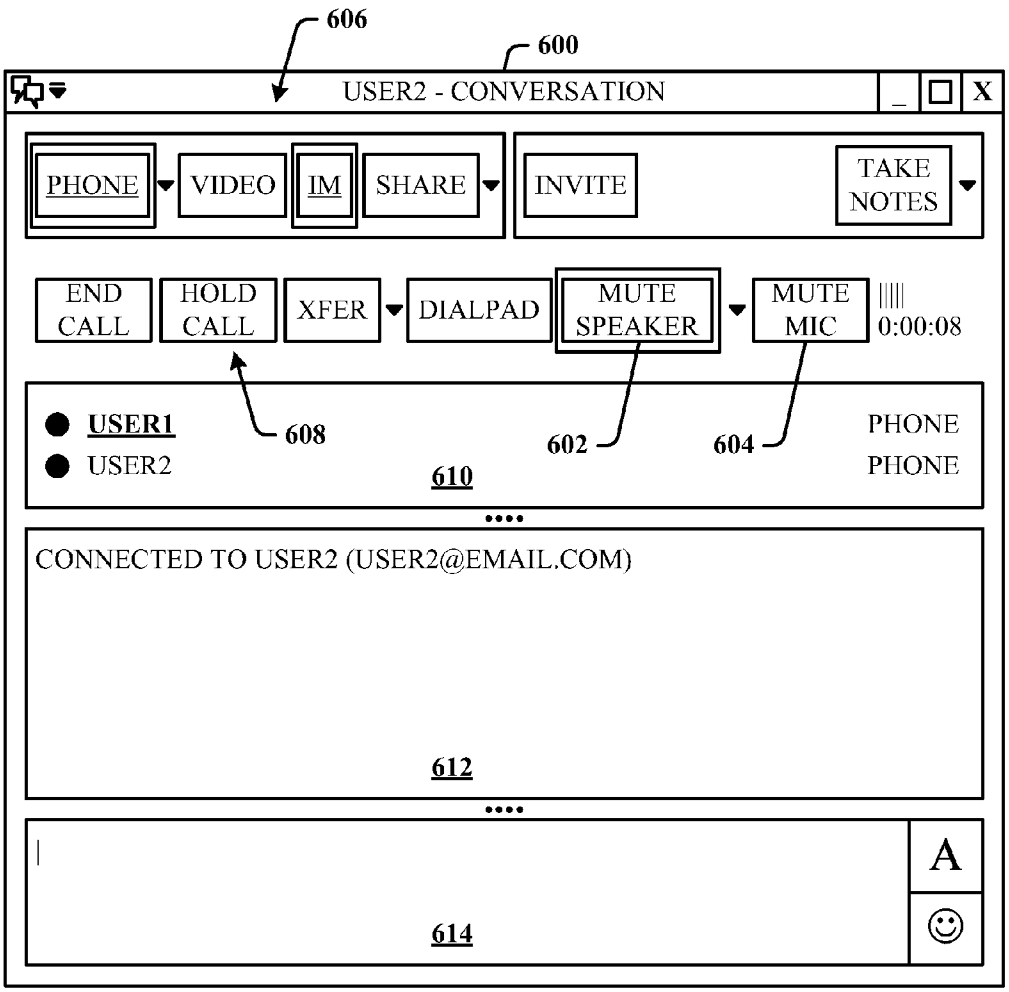
FIG. 6 illustrates an exemplary client user interface that shows an audio output device indicator associated with near-end endpoint mute state.

FIG. 6 illustrates an exemplary client user interface 600 that shows an audio output device indicator (e.g., speaker) associated with near-end endpoint mute state. For example, the indicators can include a speaker indicator 602 and microphone indicator 604. Based on the detected near-end speech input and/or the far-end speech energy received, the notification signal is received and processed by the user interface 112 of FIG. 1 to cause the corresponding graphical icon to be emphasized (e.g., color, highlighting, flashing, bolding, etc.) based on the state of the near-end device (e.g., microphone or speaker). Here, based on the mute state of the speaker and the detected speech energy received from the far-end endpoint, the user interface 600 (e.g., pop-up window) readily indicates to the user that attention is needed to unmute the speaker.

The user interface 600 also provides indicators and controls 606 for different modalities (e.g., phone, email, video, instant messaging, sharing, etc.) for connecting to the session and interacting with other endpoints (e.g., invite), as well as control buttons 608 for call control, connection modality panel 610 for the participants and modality used by other participants to the session, a connect panel 612 and a text entry panel 614 for entering and sending text.

The user interface 600 of the User1 endpoint indicates in the connection modality panel 610 that User1 is communicating to User2 by phone as well as by instant messaging. The connect panel 612 indicates the status and email address for texting to User2. The user interface 600 also shows that the speaker is muted by emphasis (e.g., highlighting, underlining, change in indicator color, etc.) as applied to the speaker indicator 602. Note that a textual notice can be presented separately or in combination with the graphical indicia emphasis. The user can then manually switch the mute or unmute state of the speaker.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
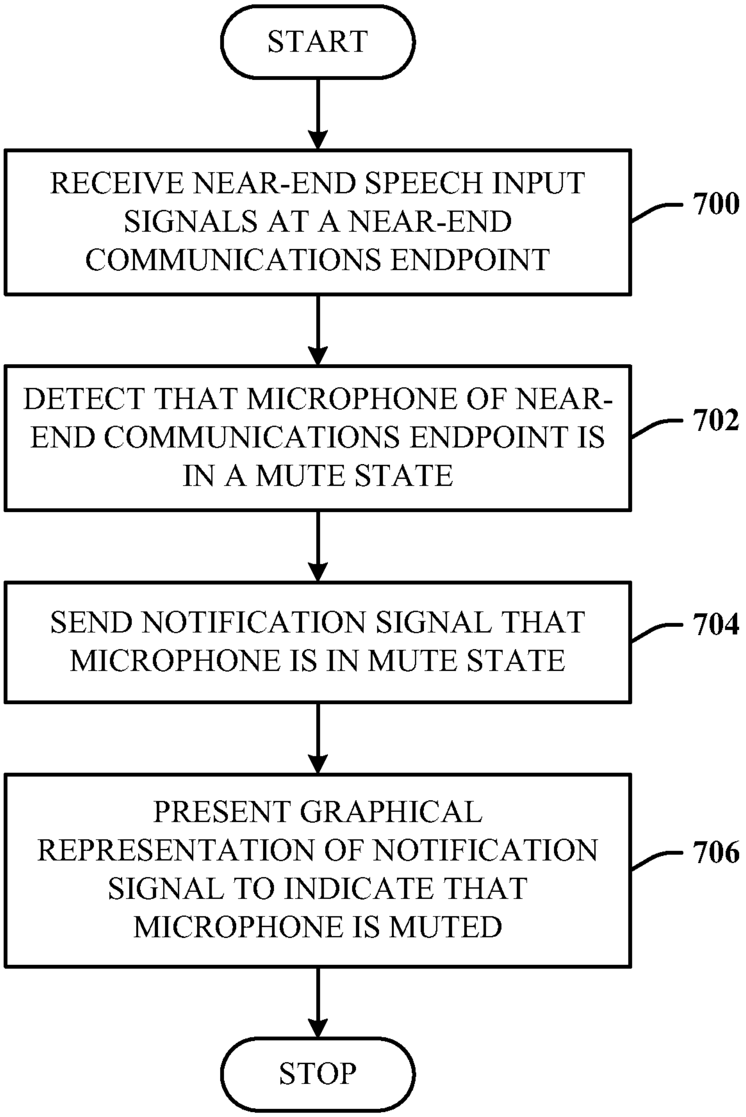
FIG. 7 illustrates a computer-implemented communications device status method.

FIG. 7 illustrates a computer-implemented communications device status method. At 700, near-end speech input signals are received at a near-end communications endpoint. This can be by utilization of a voice activity detector to detect the near-end speech. At 702, a microphone of the near-end communications endpoint is detected to be in a mute state. This can be accomplished either via HID status or measuring energy of microphone input (e.g., RMS<−50 dB full scale, then the microphone is muted). At 704, a notification signal that the microphone is in the mute state is sent. At 706, a graphical representation of the notification signal is presented to indicate that the microphone is muted.

Figure 8:
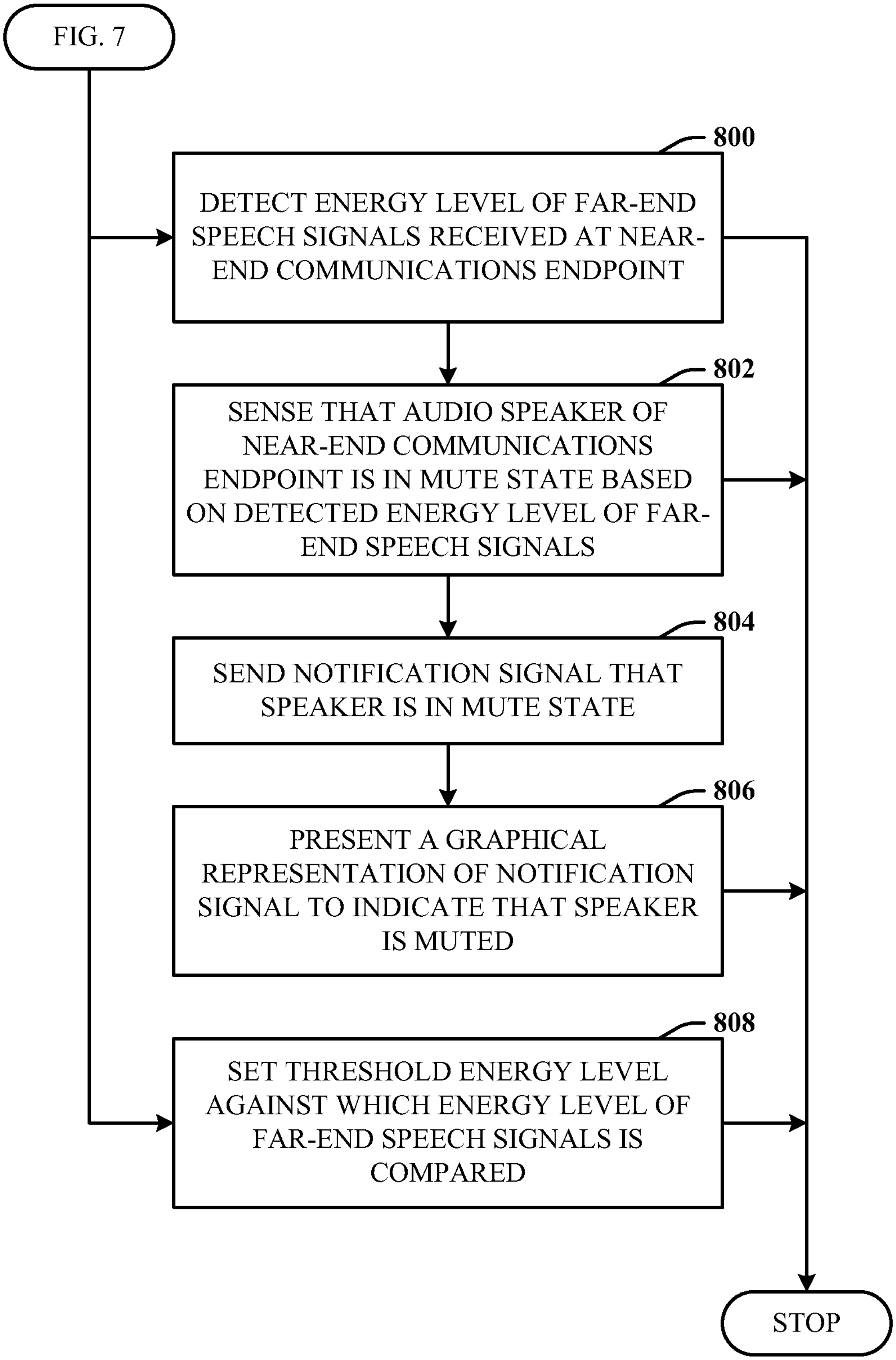
FIG. 8 illustrates additional aspects of the method of FIG. 7.

FIG. 8 illustrates additional aspects of the method of FIG. 7. At 800, an energy level of far-end speech signals received at the near-end communications endpoint is detected. At 802, an audio speaker of the near-end communications endpoint in a mute state is sensed based on the detected energy level of the far-end speech signals. This can be accomplished based on HID status (e.g., audio speaker mute or reduced volume setting such as at ten percent of full range). Another approach utilizes far-end speech signals. At 804, a notification signal that the speaker is in the mute state is sent. At 806, a graphical representation of the notification signal is presented to indicate that the speaker is muted. At 808, a threshold energy level against which the energy level of the far-end speech signals is compared, is set.

Figure 9:
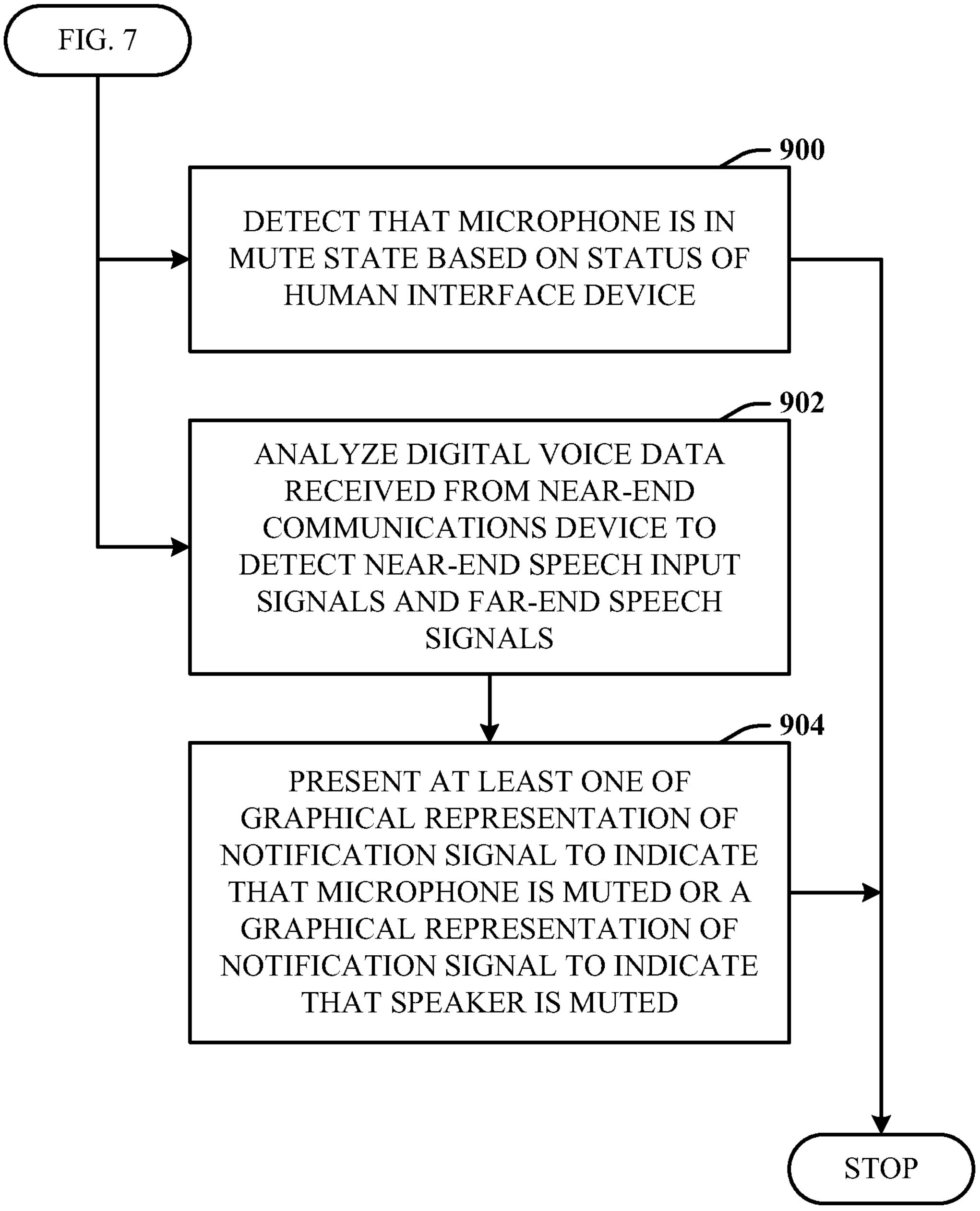
FIG. 9 illustrates additional aspects of the method of FIG. 7.

FIG. 9 illustrates additional aspects of the method of FIG. 7. At 900, detect that the microphone is in the mute state based on status of a human interface device. At 902, analyze digital voice data received from the near-end communications device to detect the near-end speech input signals and far-end speech signals. At 904, present at least one of the graphical representation of the notification signal to indicate that the microphone is muted or a graphical representation of the notification signal to indicate that the speaker is muted.

Figure 10:
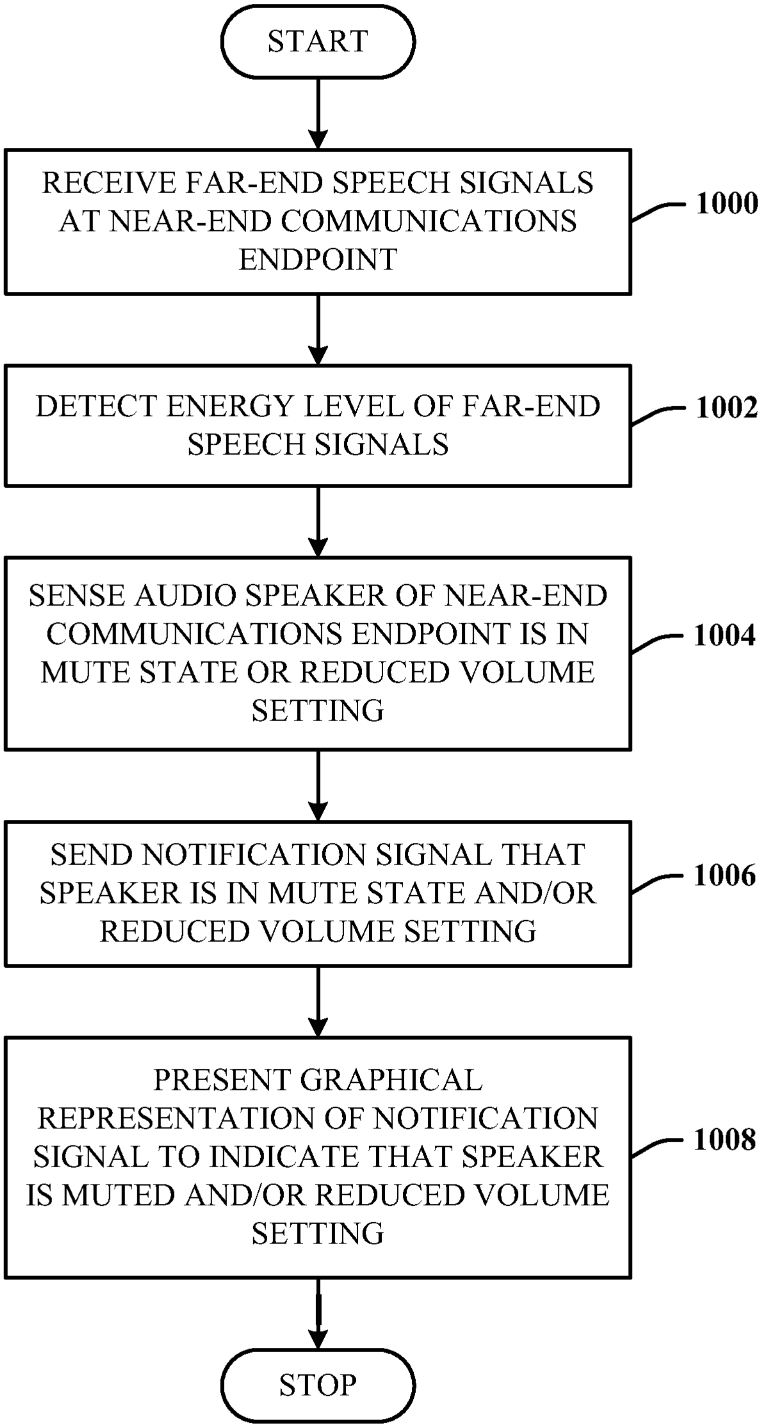
FIG. 10 illustrates a method of processing the energy in received far-end speech signals to notify a user of an audio device state.

FIG. 10 illustrates a method of processing the energy in received far-end speech signals to notify a user of an audio device state. At 1000, far-end speech signals are received at a near-end communications endpoint. At 1002, the energy level of the far-end speech signals is detected. At 1004, an audio speaker of the near-end communications endpoint is sensed to be in a mute state or reduced volume setting. At 1006, a notification signal that the speaker is in the mute state and/or reduced volume setting is sent. At 1008, a graphical representation of the notification signal is presented to indicate that the speaker is muted and/or at a reduced volume setting.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
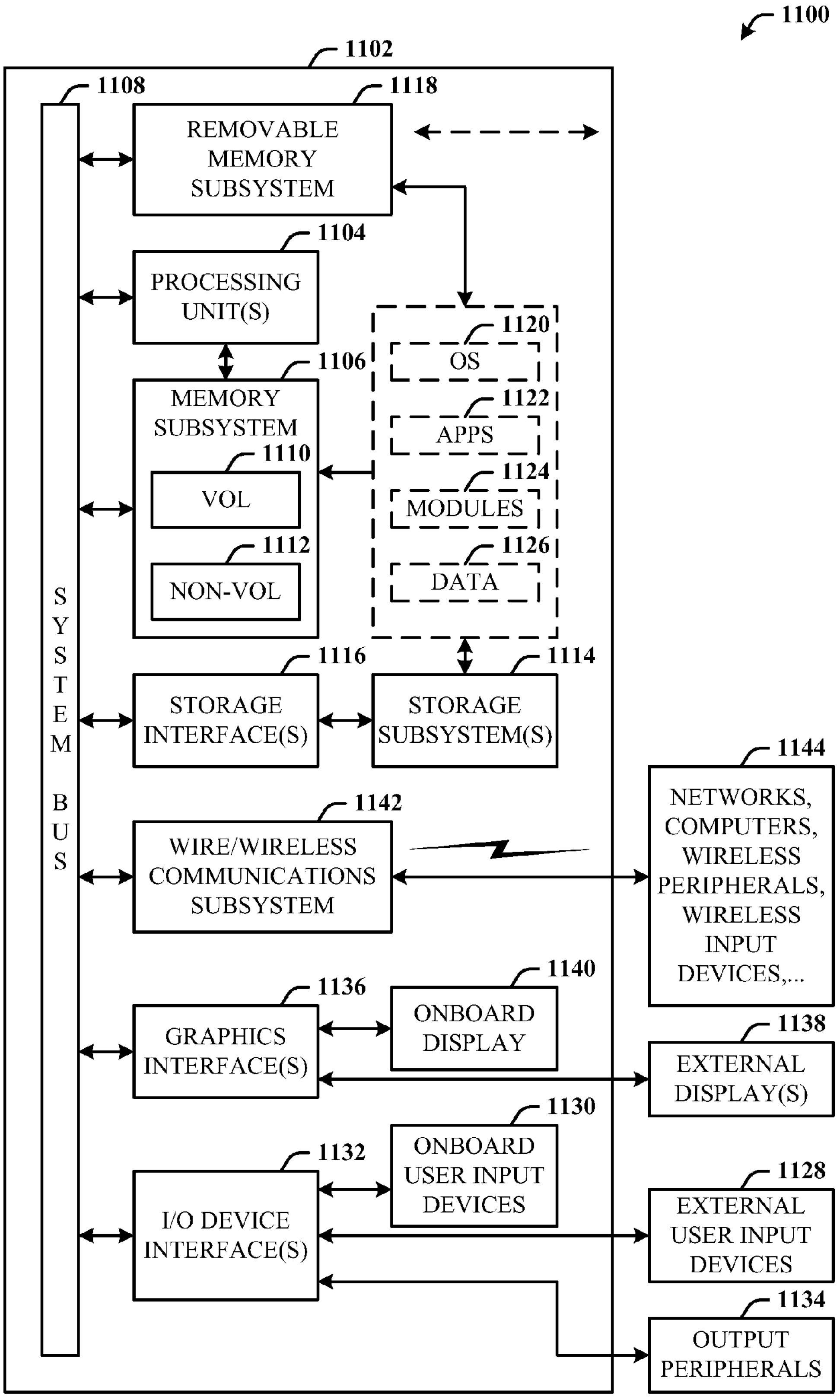
FIG. 11 illustrates a block diagram of a computing system operable to execute detection, notification, and presentation of device state in accordance with the disclosed architecture.

Referring now to FIG. 11, there is illustrated a block diagram of a computing system 1100 operable to execute detection, notification, and presentation of device state in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

Where the computer 1102 performs the detection for an external two-way communications system, the one or more application programs 1122, other program modules 1124, and program data 1126 can include the voice detection component 102, notification component 108, notification signal 110 and user interface 112 of FIG. 1, the components of the computing system 202 of FIG. 2, the components of the computing system 308 of FIG. 3, the components of the computing system 404 of FIG. 4, user interface 500 of FIG. 5, the user interface 600 of FIG. 6, and the methods represented by the flow charts of FIGS. 7-10, for example.

Where the computer 1102 is the two-way communication endpoint, the one or more application programs 1122, other program modules 1124, and program data 1126 can include the system 100 of FIG. 1, the combined components and entities of the system 300 of FIG. 3, the combined components and entities of the system 400 of FIG. 4, user interfaces of FIG. 5 and FIG. 6, and the methods represented by the flow charts of FIGS. 7-10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wired/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 Ghz band. IEEE 802.11g applies to wireless LANs and provides 20+ Mbps in the 2.4 Ghz band. Products can contain more than one band (e.g., dual band), so the networks can provide real-world performance similar to the basic 10BaseT wire Ethernet networks used in many offices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications device status system, comprising:

a voice detection component for detecting voice signals for input to a near-end speech input device associated with a near-end endpoint of an IP communications network having a far-end endpoint;

a notification component for sending a notification signal when input of the voice signals to the near-end speech input device is blocked;

a computing system of the IP communications network, including the voice detection component and the notification component, to which the far-end endpoint is communicating, the far-end endpoint sends data to the computing system when muted and the computing system responds to mute the endpoint based on the data; and a processor that executes computer-executable instructions stored in a memory.

2. The system of claim 1, wherein the voice detection component includes a voice activity detector that detects the voice signals input to the near-end speech input device, which is a microphone.

3. The system of claim 1, further comprising a user interface that changes status of graphical indicia in response to receiving the notification signal.

4. The system of claim 3, wherein the graphical indicia indicates that the near-end speech input device is muted.

5. The system of claim 3, wherein the user interface is a pop-up window which conveys that the near-end speech input device is muted.

6. The system of claim 1, wherein the voice detection component detects the voice signals based on wired or wireless digital signals received from a near-end two-way communications device that includes the speech input device, and the notification component sends the notification signal when the speech input device is muted.

7. The system of claim 1, further comprising an energy detection component for detecting energy of return voice signals from a far-end endpoint and the notification component sends a notification signal that an audio output device is at a reduced volume or muted when the energy of return voice signals is detected.

8. A computer-implemented communications device status system, comprising:
- an IP communications network having a near-end endpoint and a far-end endpoint;
- an energy detection component for detecting far-end voice signals from the far-end endpoint based on received signal energy at the near-end endpoint;
- a notification component for sending a notification signal based on a level of the signal energy at the near-end endpoint and when a near-end audio output device of the near-end endpoint is muted or at a reduced volume setting;
- a computing system of the IP communications network to which the near-end endpoint is communicating, including the energy detection component and the notification component, wherein the near-end endpoint sends data to the far-end endpoint through the computing system when muted and the computing system responds to mute the near-end endpoint based on the data; and
- a processor that executes computer-executable instructions in a memory.

9. The system of claim 8, further comprising a user interface that changes presentation status of graphical indicia in response to the signal energy of the voice signals reaching a predetermine energy threshold level and receipt of the notification signal.

10. The system of claim 9, wherein the graphical indicia indicates that the near-end audio output device is muted or at the reduced volume setting.

11. The system of claim 9, wherein the user interface is a pop-up window which conveys that the near-end audio output device is muted or at the reduced volume setting.

12. The system of claim 8, further comprising:
- a voice detection component for detecting near-end voice signals for input to a microphone and for detecting that the near-end microphone is muted; and
- a user interface that pops-up in response to receipt of the notification signal and changes presentation status of graphical indicia related to at least one of the microphone or the audio output device to indicate that the at least one of the microphone or the audio output device is muted.

13. A computer-implemented communications device status method, comprising acts of:
- receiving near-end speech input signals at a near-end communications endpoint associated with an IP communications network;
- communicating with the near-end communications endpoint from a far-end endpoint using a computing system of the IP communications network;
- detecting at the computing system that a microphone of the near-end communications endpoint is in a mute state;
- sending a notification signal from the near-end communications endpoint to the far-end endpoint using the computing system to indicate that the microphone is in the mute state;
- muting the endpoint by the computing system based on the notification signal;
- presenting a graphical representation of the notification signal to indicate that the microphone is muted; and
- utilizing a processor that executes instructions stored in a memory.

14. The method of claim 13, further comprising detecting an energy level of far-end speech signals received at the near-end communications endpoint.

15. The method of claim 14, further comprising sensing that an audio speaker of the near-end communications endpoint is in a mute state based on the detected energy level of the far-end speech signals.

16. The method of claim 15, further comprising:
- sending a notification signal that the speaker is in the mute state; and
- presenting a graphical representation of the notification signal to indicate that the speaker is muted.

17. The method of claim 14, further comprising setting a threshold energy level against which the energy level of the far-end speech signals is compared.

18. The method of claim 13, further comprising detecting that the microphone is in the mute state based on status of a human interface device.

19. The method of claim 13, further comprising:
- analyzing digital voice data received from the near-end communications device to detect the near-end speech input signals and far-end speech signals; and
- presenting at least one of the graphical representation of the notification signal to indicate that the microphone is muted or a graphical representation of the notification signal to indicate that the speaker is at least one of muted or at a reduced volume.

* * * * *